US010171183B2

United States Patent
Tomkins et al.

(10) Patent No.: US 10,171,183 B2
(45) Date of Patent: Jan. 1, 2019

(54) METHOD AND SYSTEM FOR INTERFERENCE MITIGATION IN WIRELESS COMMUNICATIONS ASSEMBLIES

(71) Applicant: PERASO TECHNOLOGIES INC., Toronto (CA)

(72) Inventors: Alexander Tomkins, Toronto (CA); Grigori Temkine, Markham (CA); Bradley Robert Lynch, Toronto (CA); Craig Farnsworth, Toronto (CA)

(73) Assignee: PERASO TECHNOLOGIES INC., Toronto (CA)

( * ) Notice: Subject to any disclaimer, the term of this patent is extended or adjusted under 35 U.S.C. 154(b) by 0 days.

(21) Appl. No.: 15/705,709

(22) Filed: Sep. 15, 2017

(65) Prior Publication Data

US 2018/0076904 A1    Mar. 15, 2018

Related U.S. Application Data

(60) Provisional application No. 62/394,896, filed on Sep. 15, 2016.

(51) Int. Cl.
| | | |
|---|---|---|
| *H04B 15/00* | (2006.01) | |
| *H04L 25/08* | (2006.01) | |
| *H04B 1/40* | (2015.01) | |
| *H04B 1/00* | (2006.01) | |

(52) U.S. Cl.
CPC .......... *H04B 15/00* (2013.01); *H04B 1/0028* (2013.01); *H04B 1/40* (2013.01); *H04L 25/08* (2013.01)

(58) Field of Classification Search
CPC .. H04H 20/38; H04H 20/426; H04N 21/4126; H04N 21/41407; H04N 21/43637; H04B 1/10; H04B 7/15585
USPC .......................................... 455/296; 375/219
See application file for complete search history.

(56) References Cited

U.S. PATENT DOCUMENTS

| | | | | |
|---|---|---|---|---|
| 2002/0068600 A1* | 6/2002 | Chihara | ................. | H04B 1/385 455/557 |
| 2003/0158729 A1* | 8/2003 | Royle | .................... | G10K 15/02 704/211 |
| 2012/0082429 A1* | 4/2012 | Isogai | ..................... | H04N 5/63 386/239 |
| 2014/0080412 A1* | 3/2014 | Kang | .................... | H04L 25/066 455/41.1 |

\* cited by examiner

*Primary Examiner* — Leila Malek (74) *Attorney, Agent, or Firm* — Perry + Currier Inc.

(57) ABSTRACT

A method in a wireless communications assembly having an antenna, a transceiver and a baseband processor, includes: at the transceiver: receiving, from the antenna, a modulated carrier signal having a carrier frequency and containing payload data; demodulating the carrier signal to extract a baseband signal having a baseband frequency and containing the payload data; generating from the baseband signal, at a converter, a digital baseband signal containing the payload data; at an encoder: receiving the digital baseband signal from the converter; generating an encoded digital baseband signal encoding the payload data for transmission at an operating frequency; the encoded digital baseband signal having at least a threshold proportion of signal level transitions that, when transmitted at the operating frequency, have transition frequencies outside a predefined restricted frequency band; and transmitting the encoded digital baseband signal to the baseband processor via an interface at the operating frequency.

18 Claims, 5 Drawing Sheets

METHOD AND SYSTEM FOR INTERFERENCE MITIGATION IN WIRELESS COMMUNICATIONS ASSEMBLIES

CROSS-REFERENCE TO RELATED APPLICATIONS

This application claims priority from U.S. Provisional Application No. 62/394,896, filed Sep. 15, 2016, the content of which is incorporated herein by reference.

FIELD

The specification relates generally to wireless communications, and specifically to a method and system for interference mitigation in wireless communications assemblies.

BACKGROUND

Various wireless communications standards, each employing different frequency bands, may be implemented within a single communication device. Such a device typically includes, for each implemented wireless standard, a transceiver connected to one or more antennas. Incoming signals are received at the antenna, demodulated by the transceiver, and transmitted at a baseband frequency to downstream processing hardware for further treatment. However, baseband transmissions from a transceiver corresponding to one standard may generate undesirable interference detectable by the antenna corresponding to another standard.

SUMMARY

An aspect of the specification provides a method in a wireless communications assembly having an antenna, a transceiver and a baseband processor, comprising: at the transceiver: receiving, from the antenna, a modulated carrier signal having a carrier frequency and containing payload data; demodulating the carrier signal to extract a baseband signal having a baseband frequency and containing the payload data; generating from the baseband signal, at a converter, a digital baseband signal containing the payload data; at an encoder: receiving the digital baseband signal from the converter; generating an encoded digital baseband signal encoding the payload data for transmission at an operating frequency; the encoded digital baseband signal having at least a threshold proportion of signal level transitions that, when transmitted at the operating frequency, have transition frequencies outside a predefined restricted frequency band; and transmitting the encoded digital baseband signal to the baseband processor via an interface at the operating frequency.

BRIEF DESCRIPTIONS OF THE DRAWINGS

Embodiments are described with reference to the following figures, in which.

DETAILED DESCRIPTION

Figure 1:
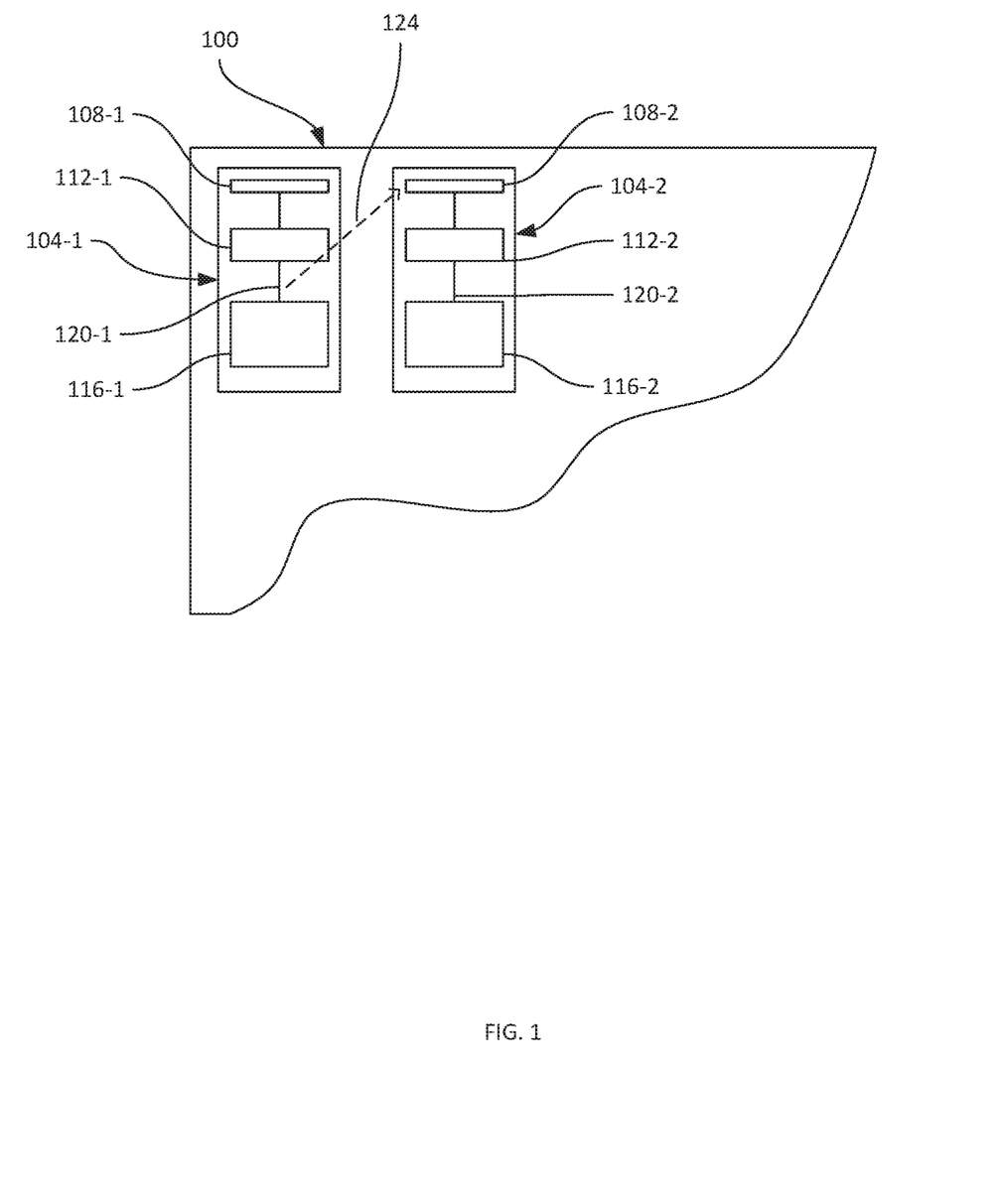
FIG. 1 depicts a communication device.

FIG. 1 depicts a portion of a communication device 100, which in the present example is a computing device such as a smart phone, tablet computer, laptop computer, or the like. In some embodiments, the communication device 100 is an accessory to a computing device such as those mentioned above. For example, the communication device 100 can comprise a dongle connectable to a computing device (e.g., via a Universal Serial Bus, USB interface) for enabling the computing device to communicate wirelessly via the communication device 100.

As will be apparent to those skilled in the art, the communication device 100 may therefore include a housing supporting a display, an input device (e.g. a touch screen integrated with the display), and any suitable internal components implementing the computing device, such as one or more integrated circuits (ICs) defining a central processor, a memory, and the like. In addition, the communication device 100 includes at least one wireless communications assembly 104. In the present example, the device 100 includes a first wireless communications assembly 104-1 and a second communications assembly 104-2 (referred to collectively as wireless communications assemblies 104 or simply assemblies 104, and generically as a wireless communications assembly 104 or simply an assembly 104; this nomenclature may be applied to other elements discussed herein). Each of the assemblies 104 includes an antenna 108-1, 108-2 (e.g., a phased array or any other suitable antenna, selected based on the wireless communications standard implemented by the assembly 104). Each assembly 104 also includes a transceiver 112-1, 112-2 and a baseband processor 116-1, 116-2. In other examples the baseband processors 116 are implemented as a single shared processor (not shown). In some examples, the baseband processors 116 are integrated with the above-mentioned central processor of the device 100 itself.

As will be apparent to those skilled in the art, incoming signals received at the antenna 108 of an assembly 104 are demodulated at the transceiver 112 and sent to the baseband processor 116 for further processing. Outgoing signals, meanwhile, are generated at the baseband processor 116 of an assembly 104, and the resulting baseband signal is provided to the corresponding transceiver 112 for modulation and emission via the corresponding antenna 108.

Signals exchanged by the baseband processors 116 and the transceivers 112 are exchanged over signal pathways 120-1, 120-2, such as circuit traces. Data transported at certain baseband signal frequencies, however, may generate undesirable interference in neighbouring wireless communication assemblies 100. For example, in the present embodiment the assembly 108-1 implements a WiGig standard, such as the IEEE 802.11 ad standard or the 802.11 ay enhancement thereto. The antenna 108-1 is therefore configured to receive and emit signals at frequencies of about 60 GHz. In certain conventional WiGig assemblies, the transceiver and the baseband processor may be configured to exchange analog baseband signals at frequencies of about 900 MHz.

The assembly 104-2, in the present example, implements a cellular standard such as the Global System for Mobile Communications (GSM) standard. The antenna 108-2 is therefore configured to receive and emit signals at frequencies of about 900 MHz. The above-mentioned conventional WiGig assemblies, which employ baseband signals having frequencies of about 900 MHz, may therefore interfere with the operation of the antenna 108-2. Specifically, in a conventional implementation the pathway 120-1 may generate wireless noise that is detectable by the antenna 108-2 via the path 124. Such noise may impede or prevent the function of the assembly 104-2.

The device 100 may include a number of other assemblies 100 implementing further wireless communications standards. Various pathways 120 may therefore be capable of generating interference that negatively impacts the performance of neighbouring assemblies 104. As a further example, a baseband signal transmitted over a pathway 120 at a frequency of about 700 MHz may interfere with an assembly 104 implementing the Long-Term Evolution (LTE) wireless communications standard. The assembly 104-1 therefore includes several features, discussed below in greater detail, to substantially prevent the generation of wireless interference impacting neighbouring assemblies 104.

Figure 2:
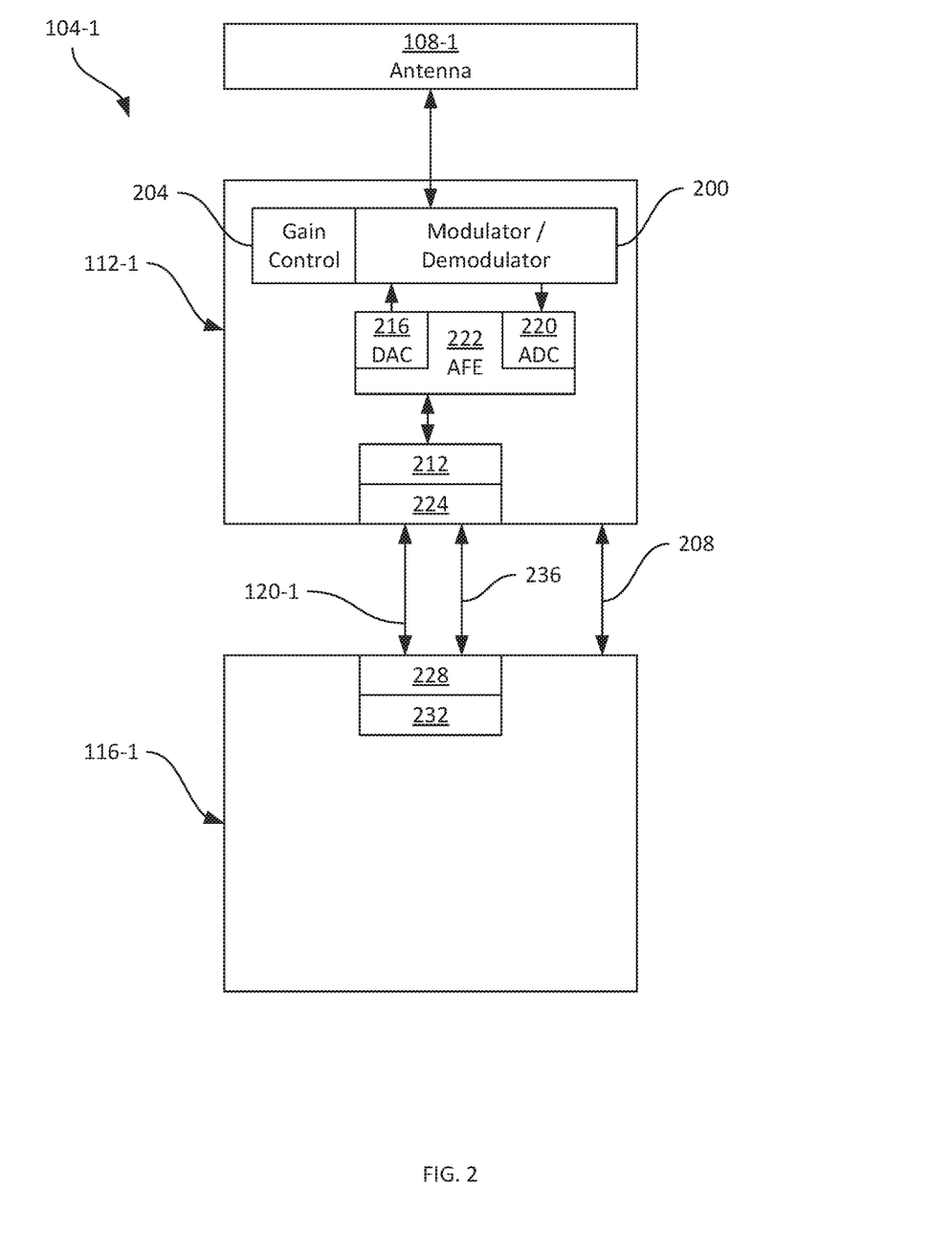
FIG. 2 depicts certain internal components of a wireless communications assembly of the device of FIG. 1.

Turning to FIG. 2, the assembly 104-1 is shown in greater detail, illustrating certain subcomponents of the transceiver 112-1 and the baseband processor 116-1. In particular, the transceiver 112-1 includes a modulator/demodulator 200 configured to receive and incoming signals from the antenna 108-1 and demodulate the incoming signals, and to receive outgoing signals from the baseband processor 116-1 and generate modulated signals for emission via the antenna 108-1. The modulator/demodulator 200 may be implemented conventionally, and need not be provided as a single component as shown in FIG. 2. That is, in other examples the modulator/demodulator 200 may be implemented as two or more distinct components (e.g. separate functional blocks in an IC implementing the transceiver 112-1). The transceiver 112-1 may also include a gain control component 204, configured to set gain levels (e.g., corresponding to the elements of a phased array transceiver) for incoming and outgoing signals. Such gain levels are typically determined by the baseband processor 116-1, and may be transmitted to the transceiver 112-1 over a conventional control pathway 208.

The transceiver 112-1 also includes an encoder/decoder 212, also referred to herein as a codec 212, as well as a converter. In particular, the converter is shown in FIG. 2 as including a digital-to-analog (DAC) converter 216 and an analog-to-digital converter (ADC) 220 connected to, or integrated with, an analog front end (AFE) controller 222. The controller 222 may be implemented as any other suitable form of controller, in other embodiments. In some embodiments (not shown), the transceiver 112-1 can also include a gain controller configured to select gain settings for communication to the gain control component 204, based on the digitized signal obtained via the ADC 220. The converters 216 and 220, in other words, enable the gain control loop for the transceiver 112-1 to be implemented entirely within the transceiver 112-1 rather than requiring the involvement of the baseband processor 116-1. In further embodiments, the transceiver 112-1 may also include a signal-detection element that receives data from the ADC 220 and determines whether to wake the baseband processor 116-1. Integration of either or both of the gain control loop and signal detection in the transceiver 112-1 may therefore permit the baseband processor 116-1 to be placed in a low-power state for greater proportions of operating time than in conventional assemblies.

The codec 212 may be implemented as one or more separate components (e.g. discrete functional blocks within the transceiver 112-1) in other embodiments. As will be discussed in greater detail below, the codec 212 enables the transceiver 112-1 and the baseband processor 116-1 to exchange encoded digital baseband signals that reduce or eliminate the generation of interference by the pathway 120-1, as opposed to analog baseband signals that may interfere with neighbouring antennas 108 as discussed above.

The transceiver 112-1 also includes an interface 224 connected to the codec 212, at which the pathway 120-1 terminates at a first end. In some examples, the codec 212 and the interface 224 may be implemented as a single component of the transceiver 112-1. The opposite end of the pathway 120-1 terminates at a corresponding interface 228 included in the baseband processor 116-1, which in turn is connected to a codec 232. The pathway 120-1 thus bridges a physical separation between the transceiver 112-1 and the baseband processor 116-1. The physical separation may be between about 1 and about 20 centimeters, in the present example. In other examples, however, separations between the transceiver 112-1 and the baseband processor 116-1 greater than 20 cm and smaller than 1 cm may be provided.

As will now be apparent to those skilled in the art, the pathway 120-1, although illustrated as a single line, need not be implemented as a single circuit trace or other signal pathway. In the present example, the pathway 120-1 is implemented as two distinct wires (e.g. circuit traces or the like) configured to carry differential signaling bi-directionally between the interfaces 224 and 228. An additional pathway 236, such as an additional pair of wires configured to carry differential signaling, may also be provided between the interfaces 224 and 228. The pathway 236, in the present example, carries a clock signal between the interfaces 224 and 228; as will be apparent, the provision of a clock signal along the pathway 236 may reduce latency in waking up one or the other of the interfaces 224 and 228 and acquiring a clock before beginning data exchange over the pathway 120-1. In other examples, the pathway 236 can be omitted.

In the present example, the interfaces 224 and 228 are serializer deserializer (SerDes) interfaces. The interfaces 224 and 228 thus each include serializer and deserializer elements. Each of the interfaces 224 and 228, accordingly, is configured to receive data from the corresponding codec 212 or 232, and to serialize the data for transmission over the pathway 120-1. Each of the interfaces 224 and 228 is also configured to receive data over the pathway 120-1 and to deserialize the data (typically after the serialized data has been decoded by the corresponding codec 212 or 232).

Figure 3:
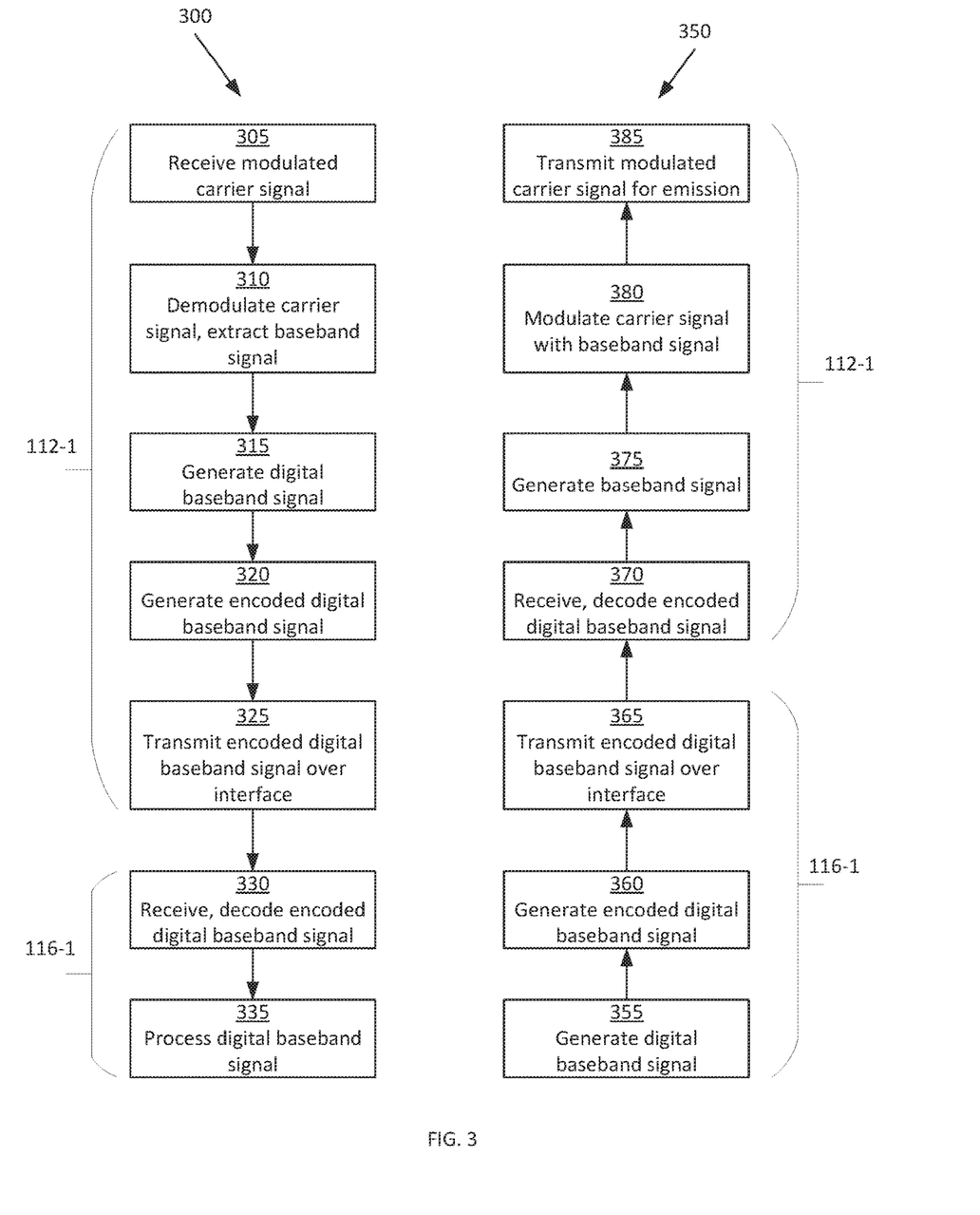
FIG. 3 depicts methods of transmitting and receiving data via the wireless communications assembly of FIG. 2.

Turning now to FIG. 3, methods 300 and 350 of receiving and transmitting data, respectively, are illustrated. The performance of the methods 300 and 350 will be discussed in conjunction with their performance by the assembly 104-1 as discussed above. As illustrated in FIG. 3, certain blocks of each of the methods 300 and 350 are performed by the transceiver 112-1, while other blocks are performed by the baseband processor 116-1.

Beginning with the method 300, at block 305 the transceiver 112-1 is configured to receive a modulated carrier signal having a carrier frequency and containing payload data. The modulated carrier signal is received from the antenna 108-1, and in the present example has a carrier frequency of about 60 GHz (in practice, the carrier signal includes a range of frequency components, encompassing a bandwidth of about 2.16 GHz, for example). At block 310, the transceiver 112-1 (specifically, the modulator/demodulator 200) is configured to demodulate the carrier signal received at block 305 to extract a baseband signal. The baseband signal is, like the carrier signal, a radio frequency (RF) signal containing the payload data. The baseband signal, however has a baseband frequency that is typically lower than the carrier frequency mentioned above. In the present example, the baseband frequency is about 900 MHz, as specified by the 802.11ad standard implemented by the assembly 104-1.

Responsive to extracting the baseband signal, the transceiver 112-1 is configured (rather than sending the baseband signal to the baseband processor 116-1 as in conventional wireless communication assemblies) to digitize the baseband signal. In particular, the modulator/demodulator 200 is configured to transmit the baseband signal to the ADC 220, which is configured to generate a digital baseband signal from the baseband signal, which may include a set of parallel bit streams (e.g. in-phase, or I, and quadrature, or Q, streams).

Following generation of the digital baseband signal at block 315, at block 320 the transceiver 112-1 is configured to generate an encoded digital baseband signal. Specifically, referring briefly to FIG. 2, the codec 212 is configured to receive the digital baseband signal from the AFE 222 and to encode the digital baseband signal for transmission over the pathway 120-1. The encoding applied by the codec 212 is selected such that, at the operating frequency of the interface 224, the encoded digital baseband signal has at least a threshold proportion of signal level transitions with transition frequencies that are outside a predefined restricted frequency band.

The digital baseband signal generated by the ADC 220, as will be apparent to those skilled in the art, consists of one or more streams of bits. Each bit is transmitted (following serialization, in the present example) over the pathway 120-1 by applying a predetermined signal level (i.e. a voltage) to the pathway 120-1. For example, each bit may be transmitted by applying a high signal level or a low signal level to the pathway 120-1. In other examples, more than two signal levels may be implemented to transmit bits. The operating frequency of the interfaces 224 and 228, as defined by the clock signal carried over the pathway 236, defines the maximum frequency at which transitions between distinct signal levels (e.g., from a high signal level to a low signal level, or vice versa) can be applied to the pathway 120-1. The effective frequency of such transitions, however, is dependent on the content of the digital baseband signal itself. For example, a digital baseband signal consisting of a continuous string of ones or zeroes has a significantly lower transition frequency than the operating frequency at which the string is transmitted. Further, the transition frequency varies with the content of the data being transmitted over the pathway 120-1.

As noted earlier, the pathway 120-1 may generate unwanted wireless emissions that may interfere with other wireless communications assemblies 104, such as the assembly 104-2. The frequency of such wireless emissions is determined by the transition frequencies of data being transmitted over the pathway 120-1. Thus, to reduce or eliminate wireless emissions from the pathway 120-1 that may interfere with neighbouring assemblies 104, the codec 212 is configured to generate an encoded digital baseband signal that, when transmitted over the pathway 120-1, leads to the generation of wireless emissions by the pathway 120-1 at frequencies that lie substantially outside of a predefined restricted frequency band. The predefined restricted frequency band typically contains the above-mentioned baseband frequency, and generally corresponds to a range of frequencies to which antennas 108 of neighbouring assemblies 104 are tuned. Thus, in the present example, the restricted frequency band is between about 500 MHz and about 6 GHz. A wide variety of other restricted frequency bands may also be implemented, based on the types of assemblies 104 present in the device 100.

To generate and transmit an encoded digital baseband signal with transition frequencies substantially outside the above range (i.e. for which at least a threshold proportion, including up to 100%, of transitions have frequencies outside the restricted range), the above-mentioned operating frequency is selected as a frequency that is greater than the baseband frequency. In the present example, the operating frequency is about 22 GHz.

Further, the encoding mechanism applied by the coded 212 is selected to increase the proportion of transition frequencies that are outside the restricted range. In other words, the encoding mechanism is selected to increase the number (and therefore the frequency) of transitions in the encoded digital baseband signal relative to the digital baseband signal. A variety of encoding mechanisms may be employed to provide the required proportion of transition frequencies lying outside the restricted range. For example, differential Manchester coding (also referred to as biphase mark encoding), Miller coding (also referred to as delay encoding), and the like may be employed. In other examples, the codec 212 may be configured to oversample the digital baseband signal prior to generating the encoded digital baseband signal, to increase the rate of transitions in the encoded signal.

Figure 4:
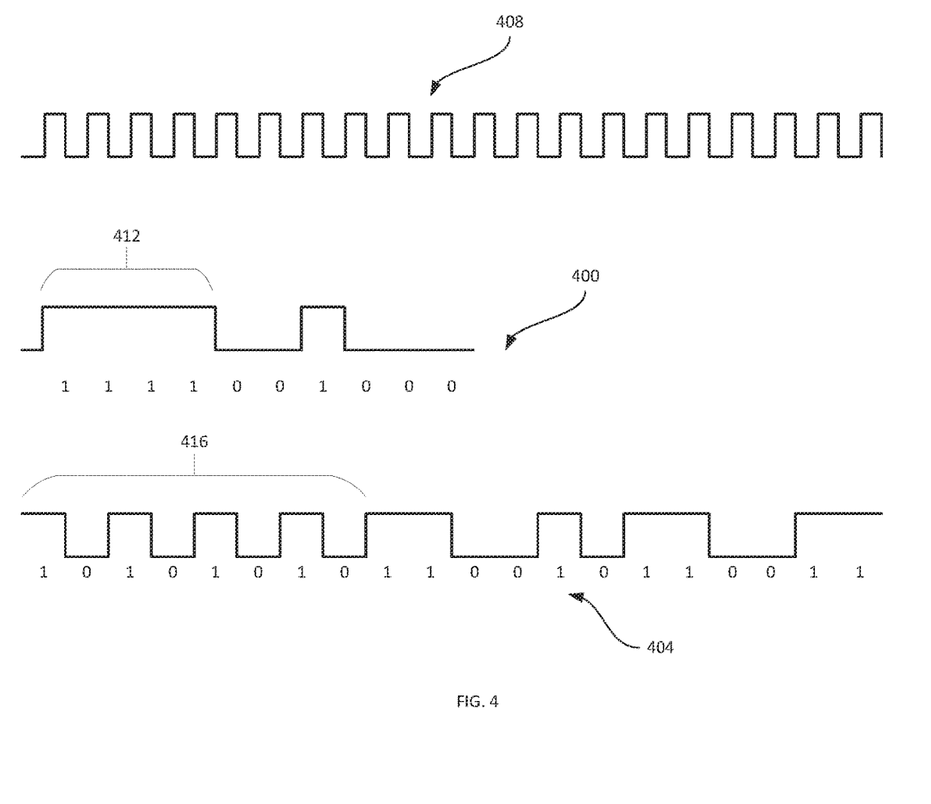
FIG. 4 illustrates an encoding mechanism employed by the wireless communications assembly of FIG. 2.

Turning to FIG. 4, an example digital baseband signal 400 and a corresponding encoded digital baseband signal 404 are shown alongside a clock signal 408. The clock signal 408 is assumed to have a frequency of 22 GHz in the illustrated example. As a result, the string 412 of four consecutive ones in the digital baseband signal 400 defines a transition that, if transmitted over the interface 224 with a 22 GHz operating frequency, would have a transition frequency of about 5.5 GHz, which falls within the restricted range mentioned earlier.

The encoded digital baseband signal 404, however, encodes the string 412 in a string 416 with a transition frequency of 22 GHz. More generally, it can be seen in FIG. 4 that no portion of the encoded digital baseband signal 404 has a transition frequency below about 11 GHz. As will also be apparent from FIG. 4, the encoded digital baseband signal 404 requires greater bandwidth than the digital baseband signal 400. Therefore, the operating frequency of the interfaces 224 and 228 is selected to provide sufficient bandwidth to accommodate the encoded digital baseband signal with minimal or no use of the restricted frequency band.

Returning to FIG. 3, at block 325 the transceiver 112-1 is configured to transmit the encoded digital baseband signal over the pathway 120-1, via the interface 224. As a result of the selected operating frequency and the encoding discussed above, the transmission of the encoded digital baseband signal over the pathway 120-1 to the interface 228 results in wireless noise at frequencies substantially outside the predefined restricted frequency band. The interface 224 is also configured, in some embodiments, to apply one or more filters (such as a high-pass LC filter) to the encoded digital baseband signal to further suppress any low-frequency components unintentionally applied to the pathway 120-1 by the interface 224.

At block 330, the baseband processor 116-1 is configured to receive and decode the encoded digital baseband signal.

In the present example, the interface 228 is configured to receive and deserialize the encoded digital baseband signal, and to pass the encoded digital baseband signal to the codec 232 for decoding and recovery of the digital baseband signal. At block 335, the baseband processor 116-1 is configured to perform any suitable processing of the digital baseband signal. Such processing can include signal detection, selection of gain settings for return to the transceiver 112-1, provision of the payload data to an application running on the device 100, and the like.

The method 350, for handling outgoing payload data, is performed substantially in reverse to the method 300. In particular, at block 355, the baseband processor 116-1 is configured to generate a digital baseband signal, for example containing payload data corresponding to an application running on the device 100. At blocks 360 and 365 the baseband processor 116-1, and specifically the codec 232, is configured to generate and transmit an encoded digital baseband signal as discussed above in connection with blocks 320 and 325, respectively.

At block 370, the interface 224 and the codec 212 are configured to receive and decode the encoded digital baseband signal to recover the digital baseband signal as generated at block 355. At block 375, the DAC 216 (e.g., via the AFE 222) is configured to generate an RF baseband signal from the digital baseband signal. At block 380, the modulator/demodulator 200 is configured to generate a modulated carrier signal containing the payload data by modulating a carrier frequency with the baseband signal. Finally, at block 385, the transceiver 112-1 is configured to transmit the modulated carrier signal to the antenna 108-1 for emission from the antenna 108-1.

Variations to the above methods and assemblies are contemplated. For example, referring to FIG. 5, an assembly 104-1 a is illustrated, in which certain components are shared with those illustrated in FIG. 2, and in which other components correspond functionally to those illustrated in FIG. 2 but differ in implementation. In particular, the assembly 104-1a includes the baseband processor 116-1 with the interface 228 and the codec 232 as discussed earlier. The assembly 104-1a also includes a transceiver 112-1a which, in contrast to the transceiver 112-1, contains the modulator/demodulator 200 and the gain control component 204 but does not contain the remaining components of the transceiver 112-1 shown in FIG. 2. Those components, including the codec 212a, interface 224a, AFE 222a and converters 216a and 220a, are contained in a discrete intermediate processor 500, connected to the baseband processor 116-1 via the pathways 120-1a and 236a. The implementation of FIG. 5 may, for example, be employed to retrofit the transceiver 112-1 with the interference-mitigation functionality described above.

Figure 5:
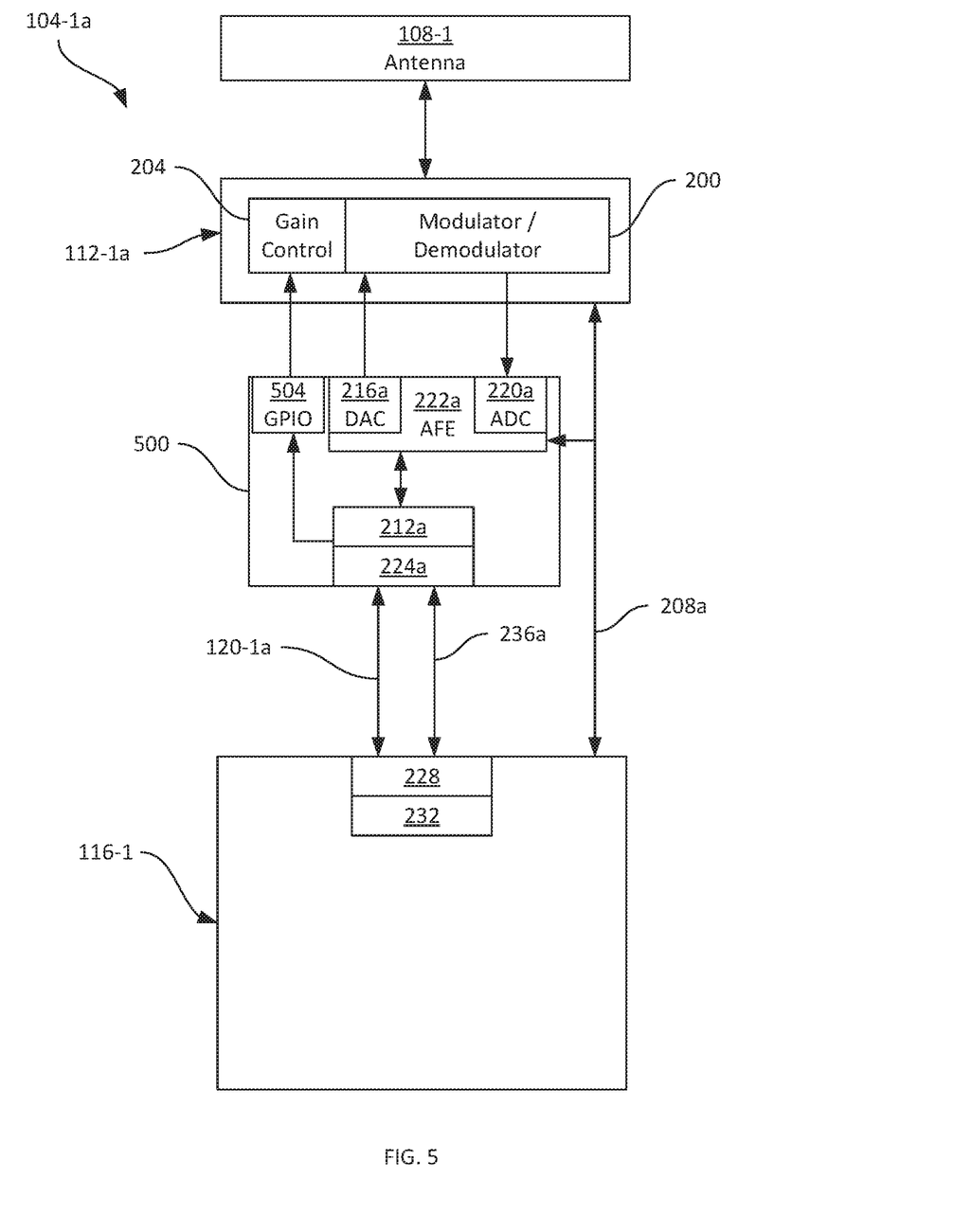
FIG. 5 depicts certain internal components of a wireless communications assembly of the device of FIG. 1, according to another embodiment.

As also shown in FIG. 5, the intermediate processor 500 also includes an input/output interface 504 connecting the codec 212a and/or the interface 224a with the gain control component 204. Although a control pathway 208a is shown between the baseband processor 116-1 and each of the transceiver 112-a and the intermediate processor 500, in some examples, control data such as gain settings may be sent via the pathway 120-1 a and applied to the gain control component 204 via the I/O interface 504.

Further, the provision of the I/O interface 504 permits, in some examples, the determination of gain settings to be implemented at the intermediate processor 500 rather than the baseband processor 116-1. Still further, certain baseband processor functionality, such as signal detection, can be implemented in the intermediate processor 500. Implementing such functionality at the intermediate processor 500 rather than the baseband processor 116-1 permits the baseband processor 116-1 to enter a low power state until woken by the intermediate processor 500 upon signal detection. The selection of gain settings, signal detection and the like can also be implemented in the transceiver 112-1 as shown in FIG. 2, as noted earlier.

In further variations, the interfaces 224 and 228 may be implemented as any other suitable type of interface than the SerDes interfaces discussed above. For example, the interfaces 224 and 228 may exchange data via digital binary phase-shift keying (BPSK) modulation, on/off-key (OOK) modulation, or the like.

The scope of the claims should not be limited by the embodiments set forth in the above examples, but should be given the broadest interpretation consistent with the description as a whole.

The invention claimed is:

1. A method in a wireless communications assembly having an antenna, a transceiver and a baseband processor, comprising:
at the transceiver:
receiving, from the antenna, a modulated carrier signal having a carrier frequency and containing payload data;
demodulating the carrier signal to extract a baseband signal having a baseband frequency and containing the payload data;
generating from the baseband signal, at a converter, a digital baseband signal containing the payload data;
at an encoder:
receiving the digital baseband signal from the converter;
generating an encoded digital baseband signal encoding the payload data for transmission at an operating frequency; the encoded digital baseband signal having at least a threshold proportion of signal level transitions that, when transmitted at the operating frequency, have transition frequencies outside a predefined restricted frequency band; and
transmitting the encoded digital baseband signal to the baseband processor via an interface at the operating frequency.

2. The method of claim 1, further comprising:
at the baseband processor, receiving and decoding the encoded digital baseband signal to recover the digital baseband signal.

3. The method of claim 1, wherein the predefined restricted frequency band contains the baseband frequency.

4. The method of claim 1, wherein the predefined restricted frequency band contains a second carrier frequency corresponding to a second wireless communications assembly.

5. The method of claim 1, wherein the predefined restricted frequency band is below the carrier frequency, and wherein the operating frequency is between the predefined restricted frequency band and the carrier frequency.

6. The method of claim 1, further comprising:
performing the generation of the digital baseband signal, and the generation of the encoded digital baseband signal at an intermediate processor connected between the transceiver and the baseband processor.

7. The method of claim 6, further comprising:
at the intermediate processor, responsive to generating the digital baseband signal, selecting a gain setting for a gain control component of the transceiver.

8. The method of claim 1, further comprising:
at the transceiver, responsive to generating the digital baseband signal, selecting a gain setting for a gain control component of the transceiver.

9. The method of claim 1, further comprising:
at the transceiver, responsive to generating the digital baseband signal, performing signal detection.

10. A wireless communications assembly, comprising:
a transceiver configured to:
  receive, from an antenna, a modulated carrier signal having a carrier frequency and containing payload data;
  demodulate the carrier signal to extract a baseband signal having a baseband frequency and containing the payload data;
a converter configured to generate, from the baseband signal, a digital baseband signal containing the payload data;
an encoder configured to:
  receive the digital baseband signal from the converter;
  generate an encoded digital baseband signal encoding the payload data for transmission at an operating frequency; the encoded digital baseband signal having at least a threshold proportion of signal level transitions that, when transmitted at the operating frequency, have transition frequencies outside a predefined restricted frequency band; and
an interface configured to transmit the encoded digital baseband signal to the baseband processor via an interface at the operating frequency.

11. The wireless communications assembly of claim 10, the baseband processor configured to:
receive and decode the encoded digital baseband signal to recover the digital baseband signal.

12. The wireless communications assembly of claim 10, wherein the predefined restricted frequency band contains the baseband frequency.

13. The wireless communications assembly of claim 10, wherein the predefined restricted frequency band contains a second carrier frequency corresponding to a second wireless communications assembly.

14. The wireless communications assembly of claim 10, wherein the predefined restricted frequency band is below the carrier frequency, and wherein the operating frequency is between the predefined restricted frequency band and the carrier frequency.

15. The wireless communications assembly of claim 10, further comprising:
an intermediate processor connected between the transceiver and the baseband processor; the intermediate processor including the converter, the encoder, and the interface.

16. The wireless communications assembly of claim 15, the intermediate processor further configured to:
responsive to generating the digital baseband signal, select a gain setting for a gain control component of the transceiver.

17. The wireless communications assembly of claim 10, the transceiver further configured to:
responsive to generating the digital baseband signal, select a gain setting for a gain control component of the transceiver.

18. The wireless communications assembly of claim 10, the transceiver further configured to:
responsive to generating the digital baseband signal, perform a signal detection.

* * * * *